(12) United States Patent
Oh et al.

(10) Patent No.: US 12,179,764 B2
(45) Date of Patent: Dec. 31, 2024

(54) METHOD OF DETERMINING TRAVELING STATE OF VEHICLE

(71) Applicants: Hyundai Motor Company, Seoul (KR); Kia Corporation, Seoul (KR)

(72) Inventors: Ji Won Oh, Gyeonggi-do (KR); Jeong Soo Eo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 160 days.

(21) Appl. No.: 17/868,481

(22) Filed: Jul. 19, 2022

(65) Prior Publication Data

US 2023/0035953 A1  Feb. 2, 2023

(30) Foreign Application Priority Data

Aug. 2, 2021 (KR) ......................... 10-2021-0101158

(51) Int. Cl.
*B60W 30/18* (2012.01)
*B60W 40/107* (2012.01)
*B60W 50/00* (2006.01)

(52) U.S. Cl.
CPC .... *B60W 30/18172* (2013.01); *B60W 40/107* (2013.01); *B60W 50/00* (2013.01);
(Continued)

(58) Field of Classification Search
CPC ......... B60W 30/18172; B60W 40/107; B60W 50/00; B60W 2552/35; B60W 2050/0022;
(Continued)

(56) References Cited

U.S. PATENT DOCUMENTS 5,253,172 A * 10/1993 Ito ........................... B60T 8/172
701/41
5,623,189 A * 4/1997 Hemmer .............. B65H 23/198
318/432
(Continued)

OTHER PUBLICATIONS

Muhammad et al., Specifications and strategies for state estimation of vehicle and platoon, Aug. 2011, KTH Electrical Engineering, pp. 1-116 (pdf).*

*Primary Examiner* — Manglesh M Patel
(74) *Attorney, Agent, or Firm* — Fox Rothschild LLP

(57) ABSTRACT

A method of determining a traveling state of a vehicle, such as passing over a speed bump, occurrence of wheel slip, or traveling on a slope, is determined in real time to prevent degradations in wheel slip control performance and to avoid unnecessarily malfunctions in a traction control system without compromise of wheel slip control performance. The method includes steps of: determining a torque command of a drive unit to apply torque to a drive wheel in accordance with vehicle driving information collected during traveling of the vehicle; determining an acceleration error in accordance with the determined torque command and information regarding a measured longitudinal acceleration of the vehicle measured by a first sensor; determining an acceleration disturbance rate in accordance with the determined torque command; and determining a current traveling state of the vehicle in accordance with the determined acceleration error and the determined acceleration disturbance rate.

20 Claims, 6 Drawing Sheets

(52) U.S. Cl.
CPC ........... *B60W 2050/0022* (2013.01); *B60W 2050/0052* (2013.01); *B60W 2510/081* (2013.01); *B60W 2510/083* (2013.01); *B60W 2520/105* (2013.01); *B60W 2520/26* (2013.01); *B60W 2530/16* (2013.01); *B60W 2552/35* (2020.02)

(58) Field of Classification Search
CPC ... B60W 2050/0052; B60W 2510/081; B60W 2510/083; B60W 2520/105; B60W 2520/26; B60W 2530/16
USPC .................. 701/50, 1, 71, 74, 82–84, 87–92
See application file for complete search history.

(56) References Cited

U.S. PATENT DOCUMENTS

| | | | | |
|---|---|---|---|---|
| 5,929,587 | A * | 7/1999 | Kang | B01D 69/125 318/632 |
| 5,936,369 | A * | 8/1999 | Iwashita | G05B 19/19 318/609 |
| 6,119,062 | A * | 9/2000 | Proger | B60T 8/00 303/155 |
| 6,292,735 | B1 * | 9/2001 | Kimbrough | B60T 8/172 701/72 |
| 6,370,467 | B1 * | 4/2002 | Kimbrough | B60T 8/17616 701/84 |
| 7,463,953 | B1 * | 12/2008 | Lee | B60K 35/28 701/1 |
| 9,227,605 | B2 * | 1/2016 | Okubo | B60T 8/17616 |
| 9,454,508 | B2 * | 9/2016 | Yu | G06F 17/00 |
| 10,124,806 | B2 * | 11/2018 | Raffone | B60T 8/172 |
| 11,787,410 | B1 * | 10/2023 | Oh | B60W 40/11 701/69 |
| 2003/0233887 | A1 * | 12/2003 | Terada | H02P 5/00 73/862.23 |
| 2005/0159871 | A1 * | 7/2005 | Nakamura | B60K 6/52 303/121 |
| 2007/0026995 | A1 * | 2/2007 | Doering | F02P 5/1504 477/107 |
| 2009/0175601 | A1 * | 7/2009 | Ikeda | H02P 23/22 388/800 |
| 2012/0046831 | A1 * | 2/2012 | Hidaka | B60W 30/045 701/38 |
| 2012/0232732 | A1 * | 9/2012 | Tsuda | B60W 10/08 903/930 |
| 2012/0323460 | A1 * | 12/2012 | Okubo | B60T 8/172 701/1 |
| 2014/0067153 | A1 * | 3/2014 | Yu | G01L 3/00 701/1 |
| 2014/0197770 | A1 * | 7/2014 | Shimoda | H02P 31/00 318/490 |
| 2016/0332633 | A1 * | 11/2016 | Raffone | B60W 40/13 |
| 2018/0118212 | A1 * | 5/2018 | McDonnell | B60W 30/188 |
| 2018/0257652 | A1 * | 9/2018 | Mueller | B60L 15/2045 |
| 2018/0273045 | A1 * | 9/2018 | Herrera | B60W 40/11 |
| 2018/0370538 | A1 * | 12/2018 | Docker | B60W 40/105 |
| 2020/0355497 | A1 * | 11/2020 | Yamada | B60W 50/0098 |
| 2021/0114457 | A1 * | 4/2021 | Eberl | B60T 8/175 |
| 2022/0026912 | A1 * | 1/2022 | Wu | B60W 30/02 |
| 2022/0089160 | A1 * | 3/2022 | Son | B60W 30/188 |
| 2022/0289181 | A1 * | 9/2022 | Shin | B60W 40/08 |
| 2023/0059643 | A1 * | 2/2023 | Jeon | B60W 30/143 |
| 2023/0070659 | A1 * | 3/2023 | Oh | B60W 30/18172 |
| 2023/0133240 | A1 * | 5/2023 | Oh | B60W 30/18172 475/86 |
| 2023/0139187 | A1 * | 5/2023 | Chang | B60W 30/143 701/23 |
| 2023/0302914 | A1 * | 9/2023 | Oh | B60L 7/18 |
| 2023/0303054 | A1 * | 9/2023 | Oh | B60W 10/04 |
| 2023/0303087 | A1 * | 9/2023 | Oh | B60W 10/22 |
| 2023/0347747 | A1 * | 11/2023 | Oh | B60L 15/2009 |
| 2023/0398880 | A1 * | 12/2023 | Yamasaki | B60L 3/0061 |
| 2023/0406306 | A1 * | 12/2023 | Oh | B60W 10/08 |

* cited by examiner

METHOD OF DETERMINING TRAVELING STATE OF VEHICLE

CROSS REFERENCE TO RELATED APPLICATION

The present application claims under 35 U.S.C. § 119(a) the benefit of Korean Patent Application No. 10-2021-0101158, filed Aug. 2, 2021, the entire contents of which are incorporated by reference herein.

BACKGROUND

(a) Technical Field

The present disclosure relates to a method of determining a traveling state of a vehicle, more particularly, to a method of accurately classifying and determining the traveling state of the vehicle in real time, such as passing over a speed bump, an occurrence of a wheel slip, or traveling on a slope.

(b) Description of the Related Art

Recently, along with rapid growth of the global electric vehicle market, consumers have come to expect higher performance from electric powertrains. These performance expectations include not only simple acceleration performance but also the ability to obtain traction force regardless of external obstructions.

The reason for the increased expectations is due to the characteristics of electric powertrains as distinguished from conventional vehicles provided with an internal combustion engine (ICE). While the internal combustion engine requires a relatively long time to generate and output power due to an air flow path and combustion process, an electric motor of the electric powertrain can generate power within a very short time. The above difference is more prominent when generated power is transferred to the wheels.

In addition, torque generated by an existing internal combustion engine is accompanied with a significant amount of torque ripple, due to the presence of reciprocal mechanical components repeating strokes. Such torque ripple must be filtered before the power is transferred to the wheels, and such an operation may be performed by applying a damping component, such as a dual mass flywheel or a torsion spring, to the powertrain.

However, a fully electrified powertrain may provide torque having substantially no ripple. Due to unique characteristics of electric vehicles (EVs), no damping component is required in the powertrain.

In addition, since a torque band and driving point of the internal combustion engine are aimed at a high rotational speed, a multi-speed transmission is required for shifting gear ratios depending on a power demand level. However, the electric motor essentially provides a torque band aimed at a low rotational speed, and thus does not require transmission components.

All of these differences contribute to an increased response rate of electrified drivetrains. It is important to effectively utilize a longitudinal response rate in order to enhance competitiveness of products in the vehicle market.

Recently, traction control systems (TCS) of the related art have been redeveloped and applied to electric vehicles. Such traction control systems may reliably improve overall tire slip control performance. The redeveloped TCS may prevent tire slip by effectively intervening to a torque command using reactivity of electric power.

However, a problem of unnecessary TCS operation (i.e., wheel slip reduction control such as traction control) may occur as a side effect. In particular, since TCS activation conditions are determined on the basis of speed measurement information, any disturbance influencing the speed may erroneously activate the TCS. Thus, there is demand for a strategy able to effectively prevent such side effects in order to obtain expected performance and positively use the TCS specialized for electric vehicles.

FIG. 1 (RELATED ART) is a diagram illustrating a related-art problem. FIG. 1 illustrates an example of disturbance that may cause erroneous activation of the TCS. Side effects of misjudgment due to the disturbance may be described as follows. Referring to FIG. 1, examples of disturbance able to cause erroneous activation of the TCS may include a speed bump, a slope of the road, and wheel slip.

First, the speed bump and the road slope may cause the same disturbance to longitudinal acceleration of a vehicle. In a situation in which the response rate of estimation of road slope information (i.e., the inclination of the road surface) is improved, a controller may erroneously determine a suspension pitch angle to be a road slope, due to the influence of the speed bump.

Here, the suspension pitch angle is information indicating the state of vibration of a vehicle in the pitch direction, due to the difference in the stroke between a front suspension unit and a rear suspension unit. When one of the front suspension unit and the rear suspension unit is more rebounded (i.e., stretched) or more bumped (i.e., contracted) than the other, the suspension pitch angle occurs.

In addition, both the road slope and the wheel slip may cause disturbance to the load of the vehicle. In sensitive wheel slip reduction control, even when no slip has occurred on the slope, erroneous entry may be caused in the control.

In addition, information regarding a speed at which no slip occurs is required in order to estimate the road slope, whereas road slope information is required in order to estimate the slip. Thus, in a situation in which the road slope is estimated on the basis of the speed of the driving wheels, it may be erroneously determined that the vehicle is on the road slope due to the occurrence of the slip even when the vehicle is on a flat road.

Furthermore, the wheel slip and the speed bump may cause the same disturbance to the speed compared to torque information. In case of the wheel slip reduction control based on sensitive steep information, the wheel slip and the speed bump may cause the control to be erroneously performed even when no slip has occurred on the speed bump.

In the TCS for electric vehicles specialized and characterized in consideration of superior driving force response rate of electric vehicles, the maximization of the wheel slip reduction performance of the TCS is limited, due to the trade-off relationship between the reduction of side effects and the reduction of the wheel slip as described above.

That is, when TCS activation conditions are alleviated to minimize the wheel slip, the TCS may unnecessarily frequently operate when traveling on the speed bump, the road slope, or like, thereby reducing vehicle drivability. In contrast, when TCS activation conditions are intensified to reduce unnecessary malfunctions of the TCS, the wheel slip may occur more frequently than other situations.

Accordingly, there is demand for a technology able to overcome side effects, i.e., unnecessary malfunctions, in the wheel slip reduction control without the compromise of the wheel slip control performance by accurately classifying and determining the traveling state of the vehicle (e.g., the speed bump, the wheel slip, or the road slope) in real time in order to prevent degradations in the wheel slip control performance caused by the above-described trade-off problem.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a method of accurately classifying and determining a traveling state of a vehicle in real time, such as passing over a speed bump, the occurrence of a wheel slip, or traveling on a slope, in order to prevent degradations in wheel slip control performance caused by a trade-off problem described above.

In order to achieve the above objective, according to one aspect of the present disclosure, there is provided a method of determining a traveling state of a vehicle, the method including: determining, by a controller, a torque command of a drive unit to apply torque to a drive wheel in accordance with vehicle driving information collected during traveling of a vehicle; determining, by the controller, an acceleration error in accordance with the determined torque command and information regarding a measured longitudinal acceleration of the vehicle measured by a first sensor, the acceleration error being defined by a difference between a reference longitudinal acceleration of the vehicle connected to the torque command and the measured longitudinal acceleration of the vehicle; determining, by the controller, an acceleration disturbance rate in accordance with the determined torque command, the acceleration disturbance rate being defined by a difference between an actual rotational acceleration of the drive unit and a reference rotational acceleration of the drive unit connected to the torque command; and determining, by the controller, a current traveling state of the vehicle in accordance with the determined acceleration error and the determined acceleration disturbance rate.

According to the present disclosure, the method of determining the traveling state of a vehicle can accurately classify and determine the traveling state of a vehicle, such as passing over a speed bump, the occurrence of a wheel slip, or traveling on a slope, in real time in order to prevent degradations in wheel slip control performance. In addition, the problem in that the TCS unnecessarily malfunctions can be overcome without compromise in the wheel slip control performance.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
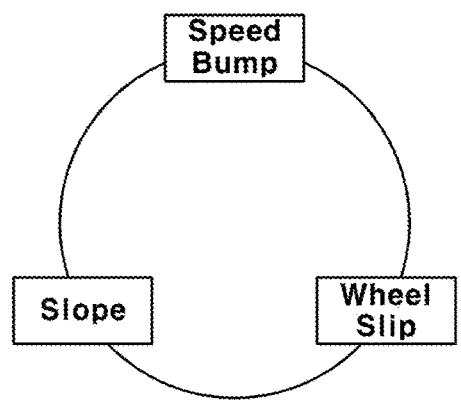
FIG. 1 (RELATED ART) is a diagram illustrating a related-art problem.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. In addition, the present disclosure is intended to cover not only the exemplary embodiments, but also various alternatives, modifications, equivalents, and other embodiments that may be included within the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled", "connected", or "linked" to another element, it can be directly coupled or connected to the other element or intervening elements may be present therebetween. In contrast, it should be understood that when an element is referred to as being "directly coupled", "directly connected", or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. Throughout the specification, the same reference numerals will refer to the same or like parts. The terminologies used herein are for the purpose of describing particular embodiments only and are not intended to limit the present disclosure. As used herein, singular forms are intended to include plural forms as well, unless the context clearly indicates otherwise.

The present disclosure is intended to provide a method of accurately classifying and determining a traveling state of a vehicle, such as passing over a speed bump (hereinafter, also referred to as "speed bump passing"), an occurrence of a wheel slip (hereinafter, also referred to as "wheel slip occurrence"), or traveling on a slope (hereinafter, also referred to as "slope traveling"), in real time.

Accordingly, it is possible to effectively prevent degradations in wheel slip control performance, such as an unnecessary control malfunction, and the reduction of wheel slip when wheel slip reduction control (such as traction control) specified in electric vehicles is applied. It is also possible to reduce or prevent the problem in that the wheel slip reduction control unnecessarily malfunctions.

Although one example of the traveling state of a vehicle will be described hereinafter as passing over a speed bump, i.e., one of a plurality of possible road obstacles, this is merely an example situation in which the vehicle passes over a portion of the road surface having a height difference (i.e., a height difference portion of the road surface). The speed bump passing may be included in the category in which the vehicle passes through a portion of the road surface that a tire touches, the portion of the road surface having a height difference from the surrounding road surface.

Thus, the speed bump passing in the following description may be substituted with passing through a portion of the road surface that the tire touches, the portion of the road surface having a height difference (hereinafter, referred to as the "height difference portion of the road surface"). For example, hereinafter, the speed bump may be substituted with a raised portion on the road surface acting as an obstacle when the tire rolls, instead of being designed to enforce slow driving.

Furthermore, a recess, such as a pothole or a puddle, formed in a concaved shape on the road surface also has a height difference from the road surface that the tire touches. Thus, hereinafter, the speed bump may also be substituted with the recess, such as a pothole or a puddle, on the road surface. That is, in the road surface that the tire touches, the height difference portion may be interpreted as including all of the obstacles, such as a speed bump and other raised portions, and the recesses, such as a pothole and a puddle.

Hereinafter, the present disclosure will be described in detail. According to the present disclosure, the difference between a longitudinal acceleration value of a vehicle used as a reference (i.e., a reference longitudinal acceleration) and a longitudinal acceleration value of the vehicle measured by a sensor (i.e., a measured longitudinal acceleration) is monitored in real time by the vehicle. Here, the difference between the reference longitudinal acceleration and the measured longitudinal acceleration is defined as the "acceleration error".

In addition, according to the present disclosure, disturbance in motor dynamics is observed, and the disturbance and rates of change (i.e., slopes) of the disturbance are monitored in real time. Here, the disturbance and the rates of change of the disturbance are defined as "acceleration disturbance" and "acceleration disturbance rate", respectively.

In addition, according to the present disclosure, it is possible to classify and determine the traveling state of a vehicle to be one or two of the speed bump passing (i.e., one of height difference portions of the road surface), the wheel slip occurrence, and the slope traveling. That is, the traveling state of a vehicle may be determined to be the speed bump passing, the wheel slip occurrence, both the speed bump passing and the wheel slip occurrence, or the slope traveling.

In addition, according to the present disclosure, the speed bump passing and the wheel slip occurrence may be classified and determined using the acceleration error and the acceleration disturbance rate. In addition, according to the present disclosure, when the acceleration disturbance has occurred while there is neither the speed bump passing nor the wheel slip occurrence, the traveling state may be determined to be the slope traveling. Here, a road slope value may be calculated by converting the size of the acceleration disturbance into a road slope.

Furthermore, the acceleration disturbance may be additionally used in order to classify and determine the traveling state to be the speed bump passing. As a result, whether or not the wheel slip reduction control is activated may be determined on the basis of vehicle traveling state information determined as above. Since whether or not the activation of the control is determined, an unnecessary control operation and a control malfunction may be prevented.

Figure 2:
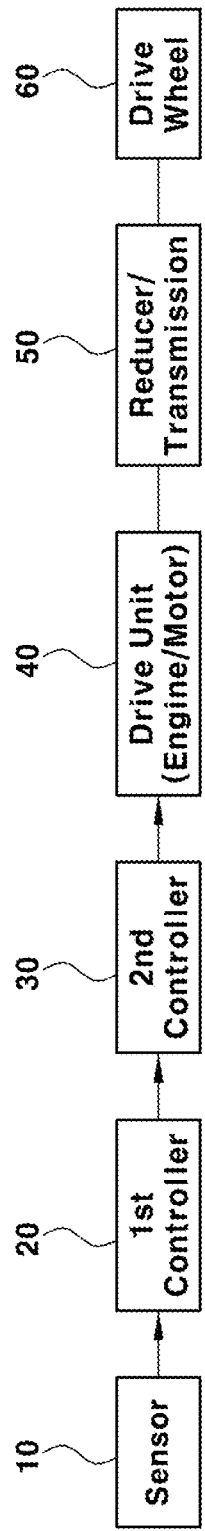
FIG. 2 is a block diagram illustrating the configuration of an apparatus for determining the traveling state of a vehicle and performing wheel slip reduction control and vehicle driving force control.

FIG. 2 is a block diagram illustrating the configuration of an apparatus for determining the traveling state of a vehicle and performing the wheel slip reduction control and the vehicle driving force control.

In the following description, the driving force may be referred to as force generated by a drive unit 40 for driving a vehicle and obtained by summing forces applied between the tire of a drive wheel 60 and the road surface. That is, the driving force may be regarded as including force generated on the drive wheel 60 by the drive unit 40, and the force generated on the drive wheels 60 may be induced by torque applied to the drive wheel 60 by the drive unit 40 (e.g., a motor) that drives the vehicle.

In particular, when the drive unit 40 of the vehicle is a motor, the torque applied to the drive wheel 60 may be drive torque that the motor outputs when running or regenerative torque generated by the motor during regenerative braking. Here, the driving force is a concept including not only the driving force that the motor outputs when running but also the regenerative torque during the regenerative braking.

In addition, the control of the driving force may be performed by controlling the torque of the drive unit 40. Here, the torque is torque applied to the drive wheel 60, indicating both drive torque generated by the motor and regenerative braking torque caused by the motor. In addition, in the following description, terms "torque" and "torque command" may be substituted with "driving force" and "driving force instruction", respectively.

Referring to FIG. 2, the apparatus for determining the traveling state of a vehicle and performing the wheel slip reduction control and the vehicle driving force control according to the present disclosure includes: a first controller 20 determining a torque command from vehicle driving information and outputting the torque command; a second controller 30 controlling the operation of the drive unit in response to the torque command received from the first controller 20; and the drive unit 40 serving as a drive source for driving the vehicle, with the operation (i.e., torque output) thereof being controlled by the second controller 30.

Here, the drive unit 40 may be a motor in an electric vehicle. Torque and rotating force output by the drive unit 40 are transferred to the drive wheel 60 through a reducer 50, as illustrated in FIG. 2.

In addition, the torque command is determined and generated on the basis of the vehicle driving information collected from the vehicle during traveling. Here, the vehicle driving information may be sensor detection (or measurement) information that is detected by a sensor 10 and input to the first controller 20 through a vehicle network.

The sensor 10 detecting the vehicle driving information may include an accelerator position sensor (APS) detecting an accelerator pedal input value input by a driver, a brake pedal position sensor (BPS) detecting a brake pedal input value input by the driver, a sensor detecting the speed of a drivetrain, a first sensor detecting the longitudinal acceleration of the vehicle, and a second sensor detecting the velocity of the vehicle.

The drivetrain speed may be the rotational speed of the drive unit 40 or the rotational speed of the drive wheel 60 (i.e., wheel speed). Here, the rotational speed of the drive unit may be the rotational speed of the motor (i.e., motor speed). Here, the sensor detecting the drivetrain speed may be a sensor detecting the motor speed, and may be a resolver detecting the position of the rotor of the motor. Alternatively, the sensor detecting the drivetrain speed may be a wheel speed sensor detecting the rotational speed of the drive wheel (i.e. the wheel speed).

In addition, the first sensor detecting the longitudinal acceleration of the vehicle may be a known acceleration sensor disposed in the vehicle. In addition, the second sensor detecting the vehicle velocity may also be a wheel speed sensor. Since vehicle velocity information being obtained from signals of the wheel speed sensor is well known in the art, a detailed description thereof will be omitted.

As sensor detection information detected by the sensor 10 described above, the vehicle driving information used to determine and generate the torque command may selectively be the accelerator pedal input value (i.e., the APS value) input by the driver, the brake pedal input value (i.e., the BPS value) input by the driver, the speed of the drive unit (i.e., the rotational speed), the vehicle velocity, or the like.

In the vehicle driving information, the accelerator pedal input value and the brake pedal input value may be driver input information, whereas the speed of the drive unit 40 and the vehicle velocity detected by the sensor 10 may be vehicle state information. In addition, as the sensor detection information, the longitudinal acceleration of the vehicle detected by the first sensor (i.e., an acceleration sensor) is used to calculate the acceleration error to be described later.

In addition, the vehicle driving information may be information determined by the first controller 20 or may be information (e.g., required driving force information) input to the first controller 20 by another controller (e.g., an ADAS controller) in the vehicle through the vehicle network. Here, the first controller 20 may be a vehicle control unit (VCU) or a hybrid control unit (HCU) generating the torque command on the basis of the vehicle driving information in a typical vehicle.

A method of determining and generating the torque command for controlling the operation of the drive unit 40, on the basis of the vehicle driving information collected from the vehicle, and a process thereof are well known in the art, and thus, detailed descriptions thereof will be omitted.

When the torque command is determined and output by the first controller 20, the operation of the drive unit 40 is controlled by the second controller 30. Thus, the power of the controlled drive unit 40 may be transferred to the drive wheel 60 through the reducer 50, thereby driving the vehicle.

The second controller 30 may be a motor control unit (MCU) driving the motor, i.e., the drive unit 40, and controlling the driving of the motor through an inverter in response to the torque command.

Although the first controller and the second controller have been described as separate control entities in the above description, the process of determining the traveling state of a vehicle according to the present disclosure may be performed by a single integrated control unit, in place of the plurality of controllers.

Here, the single integrated control unit in which the plurality of controllers is integrated may be collectively referred to as a controller. The following process of determining the traveling state of a vehicle according to the present disclosure may also be described as being performed by the controller. That is, the controller may collectively refer to the first controller and the second controller.

Hereinafter, the method of determining the traveling state of a vehicle performed by the controller will be described in more detail.

First, a process of calculating the acceleration error will be described. As described above, the acceleration error is determined by the difference between the longitudinal acceleration value of a vehicle used as a reference (hereinafter, referred to as the "reference longitudinal acceleration") and the longitudinal acceleration value of the vehicle measured by the sensor (hereinafter, referred to as the "measured longitudinal acceleration"). Here, the measured longitudinal acceleration may be a value obtained by post-treating an actual sensor measurement value by filtering or a predetermined separate processing process.

The measured longitudinal acceleration is influenced by the irregularity of the road surface. In contrast, the reference longitudinal acceleration is not influenced by the irregularity of the road surface. Thus, the acceleration error obtained from the difference between the measured longitudinal acceleration and the reference longitudinal acceleration may be used as an indicator regarding whether or not the irregularity of the road surface is present.

Here, it is important to design the reference longitudinal acceleration so as not to be influenced by the irregularity of the road surface. In the present disclosure, the torque command is intended to control the operation of the drive unit 40 driving the vehicle. Since the torque command is a command regarding torque applied to the drive wheel 60 of the vehicle, the torque command may be referred to as the wheel torque command based on the wheel.

In the present disclosure, force caused by the wheel torque applied to the drive wheel may be referred to as wheel driving force. Here, the wheel driving force may be defined as a sum of forces applied between the tire of the drive wheel 60 and the road surface by the drive unit 40 and a braking unit (not shown). The present disclosure generates a reference longitudinal acceleration profile working in concert with the wheel torque command using the wheel torque command (or a wheel driving force command) so that the reference longitudinal acceleration is not influenced by the irregularity of the road surface.

Here, the wheel torque command is torque command determined on the basis of vehicle driving information. The wheel torque command may be obtained by integrating and summing a torque command regarding the motor serving as the drive unit 40 (i.e., a drive torque command or a regenerative braking torque command) and a braking torque command regarding the braking unit.

Fundamentally, the wheel driving force and the longitudinal acceleration applied to the drive wheel by the drive unit and the braking unit have the following equation.

Wheel Driving Force−Rolling Resistance−Air Resistance=Equivalent Inertia of Vehicle×Longitudinal Acceleration of Vehicle    Equation 1

In Equation 1 above, the wheel driving force is a concept of force including all of the driving force applied to the wheel by the drive unit and the driving force applied to the wheel by the braking unit. Since the influence of the irregularity of the road surface is not considered in Equation 1, the longitudinal acceleration obtained in accordance with Equation 1 acts as a reference value not influenced by the irregularity of the road surface. That is, the longitudinal acceleration may be referred to as the reference longitudinal acceleration in Equation 1, and the reference longitudinal acceleration may be calculated in accordance with Equation 1.

In addition, the reference longitudinal acceleration may be obtained using a filter and a state observer (i.e., a first observer) designed in accordance with Equation 1, as will be described later, instead of calculation in accordance with Equation 1.

In Equation 1, regarding the resistance and equivalent inertia information, a previously-modeled value may be used. In addition, a value preset as a function for a vehicle velocity or a steering value (e.g., a steering angle), i.e., steering input information, in the vehicle driving information may be used.

In Equation 1, the equivalent inertia of the vehicle may be a value learned (or adapted) in real time. This is a value variable depending on the weight of the vehicle. As described later, the equivalent inertia may be learned using a predetermined weight estimation method as described later.

As a result, the difference between the reference longitudinal acceleration calculated by Equation 1 and the measured longitudinal acceleration measured by the first sensor (i.e., the acceleration sensor) may be calculated and determined to be the acceleration error.

In addition, as another example of determining the acceleration error in the present disclosure, the acceleration error may be determined using an observer model. The following Equations 2 to 5 are equations set to an adaptive state observer (i.e., a first observer) in the controller.

$$\hat{a}_{fil} \equiv \dot{\hat{v}}_{x,fil} = a_{meas} + L_{fil}(v_{x,meas} - \hat{v}_{x,fil}) \quad \text{Equation 2}$$

$$\hat{a}_{tq} \equiv \dot{\hat{v}}_{x,tq} = \frac{T_{whl}}{I'_{nom}}\hat{\gamma}_{scl} + \frac{T_{whl}}{I'_{nom}} - a_{drag} + L_{p1}(\hat{v}_{x,fil} - \hat{v}_{x,tq}) + \hat{\tilde{a}}_{tq} \quad \text{Equation 3}$$

$$\dot{\hat{\tilde{a}}}_{tq} = L_{i1}(\hat{v}_{x,fil} - \hat{v}_{x,tq}) \quad \text{Equation 4}$$

$$\dot{\hat{\gamma}}_{scl} = \gamma \hat{T}_{whl} L_{i1}(\hat{v}_{x,fil} - \hat{v}_{x,tq}) \quad \text{Equation 5}$$

Equations 2 to 5 may be expressed again by the following Equation 6.

$$\frac{d}{dt}\begin{bmatrix} \hat{v}_{x,fil} \\ \hat{v}_{x,tq} \\ \hat{\tilde{a}}_{tq} \\ \hat{\gamma}_{scl} \end{bmatrix} = \begin{bmatrix} -L_{fil} & 0 & 0 & 0 \\ L_{p1} & -L_{p1} & 1 & \frac{T_{whl}}{I'_{nom}} \\ L_{i1} & -L_{i1} & 0 & 0 \\ \gamma \hat{T}_{whl} L_{i1} & -\gamma \hat{T}_{whl} L_{i1} & 0 & 0 \end{bmatrix}\begin{bmatrix} \hat{v}_{x,fil} \\ \hat{v}_{x,tq} \\ \hat{\tilde{a}}_{tq} \\ \hat{\gamma}_{scl} \end{bmatrix} + \begin{bmatrix} L_{fil} v_{x,meas} + a_{meas} \\ \frac{T_{whl}}{I'_{nom}} - a_{drag} \\ 0 \\ 0 \end{bmatrix} \quad \text{Equation 6}$$

In Equations 2 to 6, respective symbols are defined as follows.

$V_{x,meas}$: measured velocity (i.e., a measured longitudinal velocity of the vehicle)

$a_{meas}$: measured acceleration (i.e., a measured longitudinal acceleration of the vehicle)

$\hat{v}_{x,fil}$: filtered velocity (i.e., a longitudinal velocity of the vehicle filtered after the measurement)

$\hat{a}_{fil}$: filtered acceleration (i.e., a longitudinal acceleration of the vehicle filtered after the measurement)

$L_{fil}$: filter gain $T_{whl}$: wheel torque (i.e., a torque command)

$I'_{nom}$: scaled equivalent inertia of the vehicle (i.e., scaled inertia)

$a_{drag}$: drag acceleration of the vehicle $L_{p1}$: P gain of the first observer $L_{i1}$: I gain of the first observer $\hat{\gamma}_{scl}$: estimated torque scaled factor $\hat{v}_{x,tq}$: estimated velocity (i.e., an estimated longitudinal velocity of the vehicle)

$\hat{a}_{tq}$: estimated acceleration (i.e., an estimated longitudinal acceleration of the vehicle)

$\hat{\tilde{a}}_{tq}$: estimated acceleration error $\gamma$: adaptive gain

The letter "x" in some of the above-mentioned symbols means the longitudinal direction of the vehicle. In addition, "meas" indicates a measured value, whereas "fil" indicates a value filtered by the filter. In addition, the velocity and the acceleration in the above equations are the longitudinal velocity and the longitudinal acceleration of the vehicle. For example, the filtered velocity and the filtered acceleration are the longitudinal velocity and the longitudinal acceleration of the vehicle filtered by the filter after detected and measured by the first sensor and the second sensor in the vehicle.

In addition, in the above equations, the drag acceleration $a_{drag}$ is a control variable well known in the vehicle control.

The drag acceleration $a_{dragg}$ may be determined to be and used as a vehicle velocity-specific value by the controller using a map having the vehicle velocity $v_{x,meas}$ (i.e. measured velocity) as an input.

In the present disclosure, the longitudinal acceleration filtered after being measured, i.e., the filtered acceleration $â_{fil}$ in the above equations, is the measured longitudinal acceleration, and the estimated acceleration $â_{tq}$ in the above equations is the reference longitudinal acceleration. To obtain the reference longitudinal acceleration, adaptation is performed using Equation 5.

In addition, the estimated acceleration error $â_{tq}$ is the acceleration error to be obtained by the observer (i.e., the first observer), i.e., the difference between the reference longitudinal acceleration and the measured longitudinal acceleration (=filtered acceleration−estimated acceleration).

Next, a process of calculating the acceleration disturbance and the acceleration disturbance will be described. As described above, the acceleration disturbance may be obtained on the basis of motor dynamics. Fundamentally, the rotational acceleration of the motor is determined by the torque and the equivalent inertia (i.e., the rotational inertia) of the motor, and is expressed by the following equation.

Torque of Drive Unit−Rotational Resistance Torque=Equivalent Rotational Torque×Rotational Acceleration of Drive Unit     [Equation 7]

In Equation 7, the torque of the drive unit may be the torque of the motor, whereas the rotational acceleration of the drive unit may be the rotational acceleration of the motor. In addition, the torque of the drive unit may be the torque command of the drive unit determined in accordance with the vehicle driving information as described above, and the torque command of the drive unit may be the torque command of the motor.

In Equation 7, information regarding the rotational resistance torque, i.e., the resistance, and the equivalent inertia is information regarding the drive unit. The information regarding the rotational resistance torque and the equivalent inertia may be used as previously modeled values in the controller. Values previously set as a function of vehicle velocities or steering values (e.g., steering angles) or the like, i.e., steering input information, of the vehicle driving information may also be used.

The rotational acceleration of the drive unit, in particular the rotational acceleration of the motor, calculated and estimated by the controller in accordance with Equation 7 is the reference value. The controller compares the rotational acceleration of the motor (i.e., the reference rotational acceleration of the drive unit) serving as the reference value with an actual rotational acceleration of the motor (i.e., the measured rotational acceleration of the drive unit).

The actual rotational acceleration of the motor is the measured rotational acceleration of the motor obtained by differentiating the rotational speed of the motor (i.e., the rotational speed of the drive unit) measured by a third sensor (i.e., a resolver). Here, the controller obtains the difference between the reference rotational acceleration of the motor and the measured rotational acceleration of the motor as the acceleration disturbance. In addition, a value obtained by differentiating the acceleration disturbance by the controller is the acceleration disturbance rate.

In addition, as another example of calculating the acceleration disturbance and the acceleration disturbance rate, the controller may calculate the acceleration disturbance using an unknown input observer (i.e., a second observer).

The following Equations 8 and 9 are model equations of the unknown input observer according to the present disclosure, set to a state observer (i.e., the second observer) in the controller for determining the acceleration disturbance and the acceleration disturbance rate.

$$\dot{\hat{\omega}}_{mot} = \frac{1}{r_g} T_{whl} + L_{p2}(\omega_{mot} - \hat{\omega}_{mot}) + \hat{\alpha}_{mot} \quad \text{[Equation 8]}$$

$$\dot{\hat{\alpha}}_{mot} = L_{i2}(\omega_{mot} - \hat{\omega}_{mot}) \quad \text{[Equation 9]}$$

In Equations 8 and 9, respective symbols are defined as follows.

$\omega_{mot}$: measured rotational speed of the motor (i.e., the drive unit)

$\hat{\omega}_{mot}$: estimated rotational speed of the motor (i.e., the drive unit)

$\dot{\hat{\alpha}}_{mot}$: acceleration disturbance rate $\hat{\alpha}_{mot}$: estimated rotational acceleration error of the motor (i.e., the drive unit)

$L_{p2}$: P gain of the second observer $L_{i2}$: I gain of the second observer $r_g$: effective gear ratio $T_{whl}$: wheel torque (i.e., torque command)

In Equation 8 above, the effective gear ratio $r_g$ indicates a reduction ratio (i.e., a gear ratio) from the motor (i.e., the drive unit) to the drive wheel. In Equation 9, $\dot{\hat{\alpha}}_{mot}$ is the acceleration disturbance rate. In addition, acceleration disturbance may be obtained by integrating the acceleration disturbance rate.

As illustrated in Equation 9, the acceleration disturbance rate $\dot{\hat{\alpha}}_{mot}$ may be obtained by the controller using the rotational speed of the motor measured by the sensor (i.e., the resolver) and the rotational speed of the motor estimated in accordance with the above equations.

In particular, the acceleration disturbance rate $\dot{\hat{\alpha}}_{mot}$ may be calculated using the rotational speed of the motor measured by the third sensor, the rotational speed of the motor estimated in accordance with Equation 7, and the I gain $L_{i2}$ of the observer (i.e., the second observer).

Further, the acceleration disturbance rate $\dot{\hat{\alpha}}_{mot}$ may be obtained as the value of $L_{i2}(\omega_{mot}-\hat{\omega}_{mot})$ by the controller. Here, the estimated rotational speed of the motor may be obtained by the controller by integrating the rotational acceleration of the motor obtained in accordance with Equation 7, i.e., the reference rotational acceleration of the motor.

As described above, in the present disclosure, when the acceleration disturbance rate is obtained using Equations 8 and 9 of the observer, the controller may obtain the acceleration disturbance by integrating the acceleration disturbance rate. In the present disclosure, the acceleration disturbance rate $\dot{\hat{\alpha}}_{mot}$ indicates a value obtained by differentiating the rotational acceleration error of the motor indicated with $\hat{\alpha}_{mot}$ in Equation 8. In addition, the acceleration disturbance means the rotational acceleration error $\hat{\alpha}_{mot}$ of the motor, i.e., the difference between the reference rotational acceleration of the motor and the measured rotational acceleration of the motor. That is, the estimated to rotational acceleration error $\hat{\alpha}_{mot}$ of the motor means the acceleration disturbance to be obtained.

In the present disclosure, all of the speed bump passing, the wheel slip occurrence, and the slope traveling serve to increase the acceleration disturbance. This is because all of these three situations correspond to disturbance during the traveling of the vehicle. However, the slope traveling among the three situations does not increase the acceleration disturbance rate.

Since a sudden change in the acceleration disturbance only occurs during the speed bump passing and the wheel slip occurrence, the acceleration disturbance rate is increased by either the speed bump passing or the wheel slip occurrence. Thus, whether the disturbance is caused by the slope traveling or by either the wheel slip occurrence or the speed bump passing may be determined on the basis of the value of the disturbance rate.

It is known in the art that separate acceleration disturbance for the observation of the slope rather than for the determination of the slip may be obtained using a value measured by the longitudinal acceleration sensor (i.e., the first sensor) and wheel speed information.

Although the height difference portion on the road surface has been illustrated as the speed bump in the description of the present disclosure, the height difference portion may be extensively applied to any obstacle, such as a raised portion, a puddle, or a pothole, having road surface irregularity, in addition to the speed bump.

Hereinafter, an apparatus and method for classifying and determining the traveling state of a vehicle on the basis of information regarding the acceleration error, the acceleration disturbance, and the acceleration disturbance rate determined by the controller in real time as described above will be described in detail.

Figure 3:
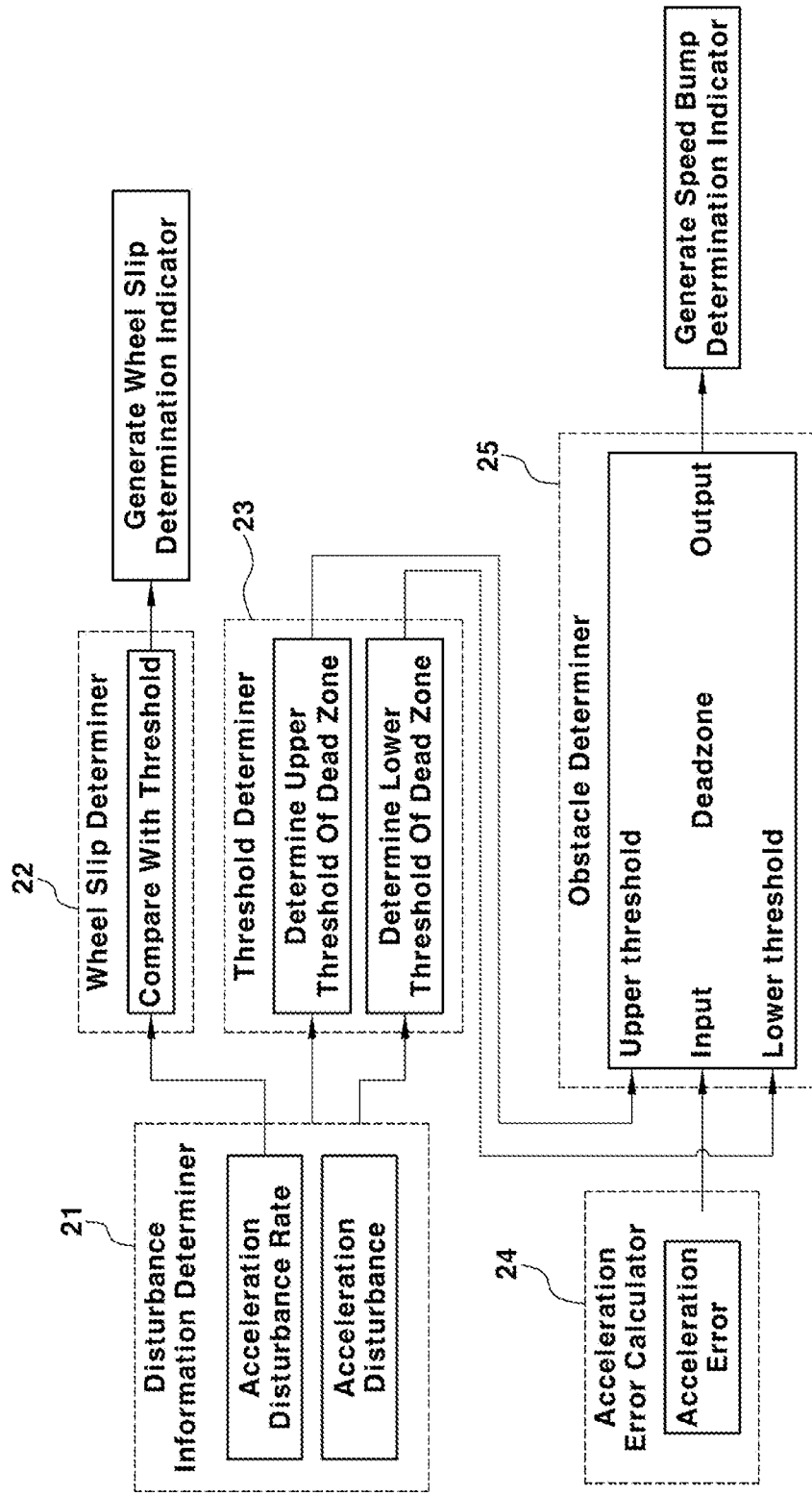
FIG. 3 is a control block diagram illustrating an example in which the acceleration error, the acceleration disturbance, and the acceleration disturbance rate are used in determining the traveling state of a vehicle according to the present disclosure.

FIG. 3 is a control block diagram illustrating an example in which the acceleration error, the acceleration disturbance, and the acceleration disturbance rate are used in determining the traveling state of a vehicle according to the present disclosure. As illustrated in FIG. 3, the apparatus for determining the traveling state of a vehicle includes components in the first controller 20 (see FIG. 1) having information detected and measured by the sensor 10 (see FIG. 1) and the torque command of the drive unit (i.e., the motor) as inputs.

That is, the apparatus for determining the traveling state of a vehicle according to embodiments of the present disclosure includes a disturbance information determiner 21, a wheel slip determiner 22, a threshold determiner 23, an acceleration error calculator 24, and an obstacle determiner 25.

Here, the disturbance information determiner 21 is a component for calculating and determining the acceleration disturbance and the acceleration disturbance rate in accordance with Equations 7 to 9. The disturbance information determiner 21 may include the above-described second observer.

In addition, the wheel slip determiner 22 is a component for determining the wheel slip occurrence on the basis of the acceleration disturbance rate determined by the disturbance information determiner 21. The threshold determiner 23 is a component for determining a threshold value for setting a dead zone function using the acceleration disturbance rate or the acceleration disturbance rate and the acceleration disturbance determined by the disturbance information determiner 21.

In addition, the acceleration error calculator 24 is a component for calculating and determining the acceleration error in accordance with Equations 1 to 6. The acceleration error calculator 24 may be configured by including the above-described first observer. In addition, the obstacle determiner 25 is a component for determining whether or not the vehicle is passing through the height difference portion, such as a speed bump, on the road using the dead zone function determined in accordance with the threshold value determined by the threshold determiner 23 using the acceleration error determined by the acceleration error calculator 24 as an input.

Hereinafter, the apparatus and method for determining the traveling state of a vehicle will be described in more detail.

In the wheel slip occurrence, the acceleration error also occurs by a value corresponding to the calculated acceleration disturbance or the calculated acceleration disturbance rate. This is because the wheel slip is not considered in the process of generating the reference longitudinal acceleration used for calculating the acceleration error.

Thus, in the wheel slip occurrence, in order to remove a value from the acceleration error by the corresponding component, values derived in accordance with a function of the acceleration disturbance and the acceleration disturbance rate may be set to be the dead zone of the acceleration error.

In other words, it is possible to only extract an acceleration error component exceeding a component derived by the acceleration disturbance and the acceleration disturbance rate and use the extracted acceleration error component as an indicator for determining the speed bump (i.e., the raised portion on the road surface).

Here, the dead zone is implemented as a dynamic dead zone in which threshold values thereof change in real time. The threshold values are generated by performing calculation and determination in accordance with a function of the acceleration disturbance rate or a function of the acceleration disturbance rate and the acceleration disturbance.

For example, it is possible to set an upper envelope value or an upper peak value to be the upper threshold value of the dynamic dead zone and set the lower envelope value or a lower peak value to be a lower threshold value of the dynamic dead zone by using an envelope function, a pseudo-peak-peak detection function, or the like of a value obtained by linearly combining the acceleration disturbance and the acceleration disturbance rate.

Describing in more detail, first, the wheel slip determiner 22 of the controller (i.e., the first controller) determines whether or not the wheel slip has occurred in accordance with the acceleration disturbance rate. Here, when the acceleration disturbance rate exceeds a preset threshold value, the wheel slip determiner 22 determines that the wheel slip has occurred.

In addition, in a situation in which the wheel slip determiner 22 determines that the wheel slip has occurred, when the current traveling state of the vehicle is determined to be a wheel slip state, the controller generates a wheel slip determination indicator. Here, the wheel slip determination indicator is an indicator indicating that the wheel slip has occurred.

In addition, the controller determines whether or not the vehicle passes over a speed bump, on the basis of the acceleration disturbance rate and the acceleration error. Here, the controller may be configured to determine whether or not the vehicle passes over a speed bump using the dynamic dead zone function.

That is, the threshold determiner 23 of the controller determines the upper threshold value and the lower threshold value of the dead zone in accordance with the acceleration disturbance rate determined by the disturbance information determiner 21. The obstacle determiner 25 compares the acceleration error determined by the acceleration error calculator 24 with the upper threshold value and the lower threshold value determined by the threshold determiner 23.

Here, when the acceleration error is a value within the dead zone determined by the upper threshold value and the lower threshold value, the obstacle determiner 25 determines that the vehicle does not pass over the speed bump. When the acceleration error is a value equal to or smaller than the upper threshold value and equal to or greater than the lower threshold value, the current traveling state of the vehicle is determined to not be the speed bump passing.

In contrast, when the acceleration error is out of the dead zone, the obstacle determiner 25 determines the current traveling state of the vehicle to be the speed bump passing. When the acceleration error is greater than the upper threshold value or smaller than the lower threshold value, the current traveling state of the vehicle is determined to be the speed bump passing.

The threshold determiner 23 of the controller may determine the upper threshold value and the lower threshold value to be values of the envelope function or the peak-peak detection function, with the acceleration disturbance rate being an input. The envelope values or the upper and lower peak values may be obtained from a diagram illustrating the values of the acceleration disturbance rate so as to be used as the upper threshold value and the lower threshold value.

In addition, when the obstacle determiner 25 determines that the vehicle is passing over the speed bump, i.e., when the current traveling state of the vehicle is determined to be the speed bump passing, the controller generates a speed bump determination indicator. Here, the speed bump determination indicator is an indicator indicating the speed bump passing.

Although it has been described above that the controller determines whether or not the vehicle passes over the speed bump on the basis of the acceleration disturbance rate and the acceleration error, the controller may further use the acceleration disturbance in determining whether or not the vehicle passes over the speed bump. That is, the controller may be configured to determine whether or not the vehicle passes over the speed bump on the basis of the acceleration disturbance rate, the acceleration disturbance, and the acceleration error.

Here, a value obtained by linearly combining the acceleration disturbance rate and the acceleration disturbance may be used. In particular, the threshold determiner 23 may multiply the acceleration disturbance rate and the acceleration disturbance with set weights, respectively, sum the products of the multiplication, and use the sum in determining the threshold value.

That is, the threshold determiner 23 multiplies the acceleration disturbance rate with a preset disturbance rate weight factor β (where β<1), multiplies the acceleration disturbance with a preset disturbance weight factor 1−β, sums the products of the multiplication, and determines the upper threshold value and the lower threshold value from the sum.

In this case, the upper threshold value and the lower threshold value may also be determined to be values of the envelope function or the peak-peak detection function, with a value obtained by weighting the acceleration disturbance rate and the acceleration disturbance and summing the weighted values being used as an input. The envelope values or the upper and lower peak values are obtained from a diagram illustrating values obtained through the weighting and the summing so as to be used as the upper threshold value and the lower threshold value.

In addition, in this case, the obstacle determiner 25 may also determine whether or the vehicle passes over the speed bump using the dynamic dead zone function. That is, after the upper threshold value and the lower threshold value are determined from the values obtained through the weighting and the summing by the threshold determiner 23, the obstacle determiner 25 receives the upper threshold value and the lower threshold value determined by the threshold determiner 23. Subsequently, the obstacle determiner 25 receives the acceleration error determined by the acceleration error calculator 24 and compares the acceleration error with the upper threshold value and the lower threshold value.

Here, when the acceleration error is a value within the dead zone determined by the upper threshold value and the lower threshold value, it is determined that the vehicle does not pass over the speed bump. When the acceleration error is a value equal to or smaller than the upper threshold value and equal to or greater than the lower threshold value, the current traveling state of the vehicle is determined to not be the speed bump passing.

In contrast, when acceleration error is out of the dead zone, the obstacle determiner 25 determines that the vehicle has passed over the speed bump. When the acceleration error is greater than the upper threshold value or smaller than the lower threshold value, the current traveling state of the vehicle is determined to be the speed bump passing. Subsequently, when the obstacle determiner 25 determines that the current traveling state of the vehicle to be the speed bump passing, the controller generates the speed bump determination indicator.

In addition, when both wheel slip occurrence determination conditions (i.e., conditions in which the acceleration disturbance rate exceeds the threshold value) and speed bump passing determination conditions (i.e., conditions in which the acceleration error is within the dead zone) described above are met, the controller (i.e., the wheel slip determiner and the obstacle determiner) may determine the current traveling state of the vehicle to be both the wheel slip occurrence and the speed bump passing and simultaneously generate the wheel slip determination indicator and the speed bump determination indicator.

In addition, when none of the two conditions is met, the controller converts the acceleration disturbance at the corresponding point in time into a slope. Here, the controller may calculate a road slope value from the size of the acceleration disturbance using an equation defining the correlation between the acceleration disturbance and the road slope.

Figure 4:
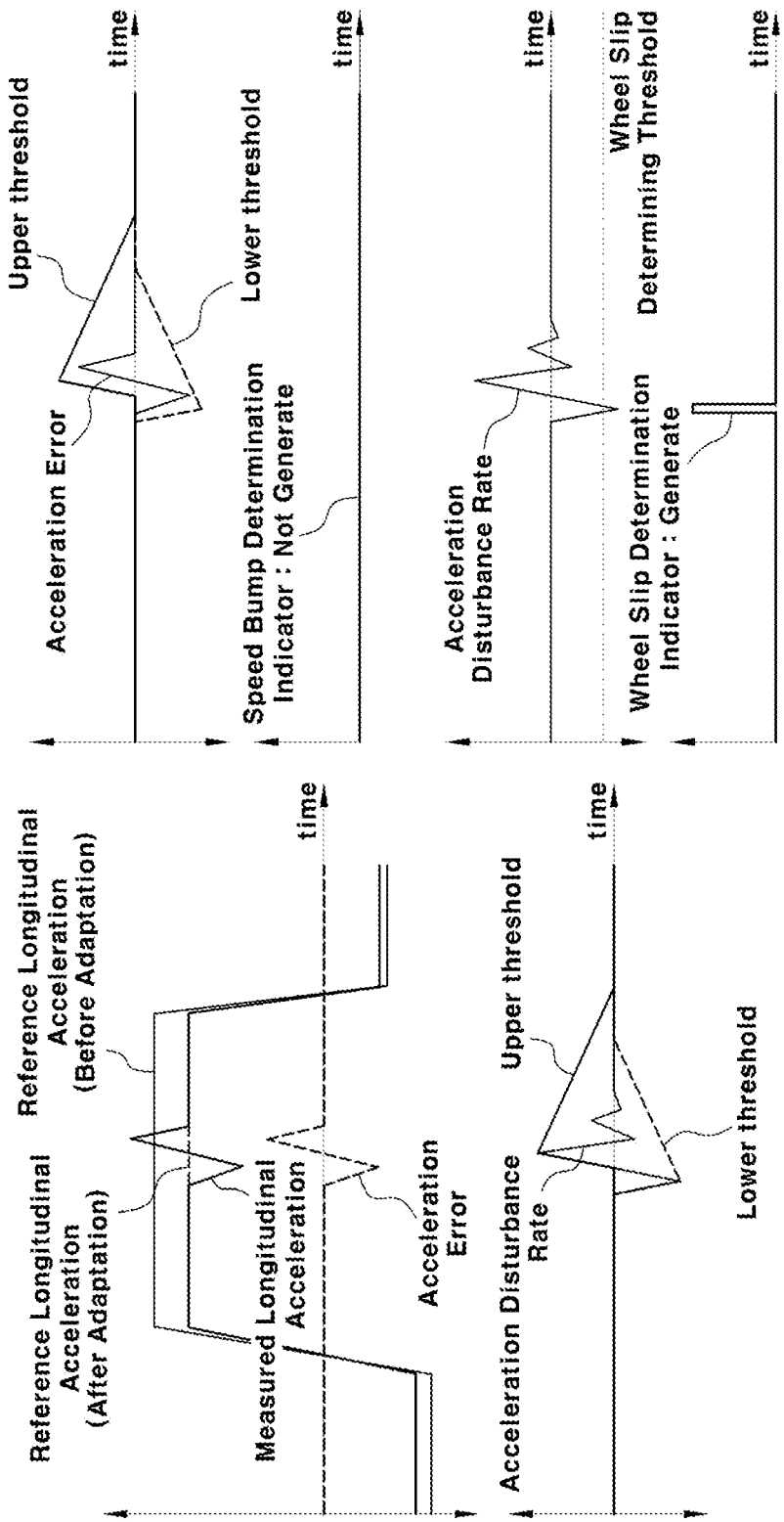
FIG. 4 is a set of graphs illustrating an example of determining a wheel slip occurrence according to the present disclosure.
Figure 5:
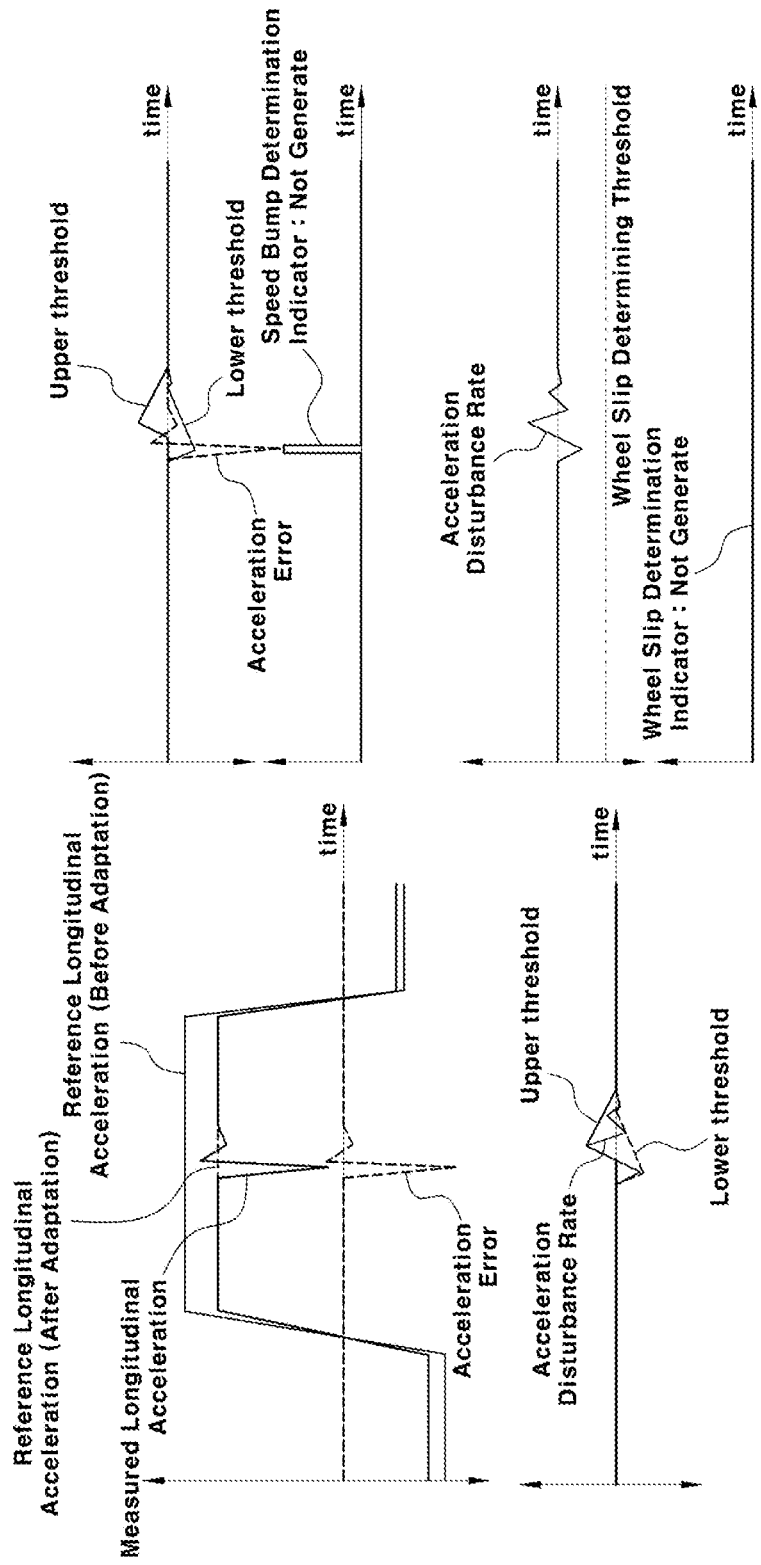
FIG. 5 is a set of graphs illustrating an example of determining speed bump passing according to the present disclosure.

Hereinafter, a method of determining the wheel slip occurrence and the speed bump passing in accordance with the acceleration disturbance rate and the acceleration error will be described with reference to the drawings. FIG. 4 is a set of graphs illustrating an example of determining a wheel slip occurrence according to the present disclosure, and FIG. 5 is a set of graphs illustrating an example of determining speed bump passing according to the present disclosure.

First, FIG. 4 illustrates the reference longitudinal acceleration and the measured longitudinal acceleration before and after adaptation, and illustrates that the acceleration error is determined to be the difference between the reference longitudinal acceleration and the measured longitudinal acceleration after the adaptation.

In addition, referring to FIG. 4, the upper threshold value and the lower threshold value are determined using the envelope function or the pseudo-peak-peak detection function from the acceleration disturbance rate.

In the example illustrated in FIG. 4, the acceleration error remains as a value between the upper threshold value and the lower threshold value, and thus, the traveling state is not determined to be the speed bump passing. Consequently, the speed bump determination indicator is not generated.

In contrast, the absolute value of the acceleration disturbance rate exceeds the absolute value of the threshold value serving as a reference for the determination of the wheel slip, and thus, the traveling state is not determined to be the wheel slip occurrence. Consequently, the wheel slip determination indicator is generated.

Next, in the example illustrated in FIG. 5, the acceleration error is determined to be the difference between the reference longitudinal acceleration and the measured longitudinal acceleration after the adaptation, and the upper threshold value and the lower threshold value are determined in accordance with the acceleration disturbance rate in the same manner.

In addition, in the example illustrated in FIG. 5, the acceleration error is out of the range between the upper threshold value and the lower threshold value, and the acceleration error is determined to be a value smaller than lower threshold value or greater than the upper threshold value. Thus, the traveling state is determined to be the speed bump passing. Consequently, the speed bump determination indicator is generated.

In contrast, since the absolute value of the acceleration disturbance rate does not exceed the absolute value of the threshold value serving as a reference for the determination of the wheel slip, the traveling state is determined to not be the wheel slip occurrence. Consequently, the wheel slip determination indicator is not generated.

Figure 6:
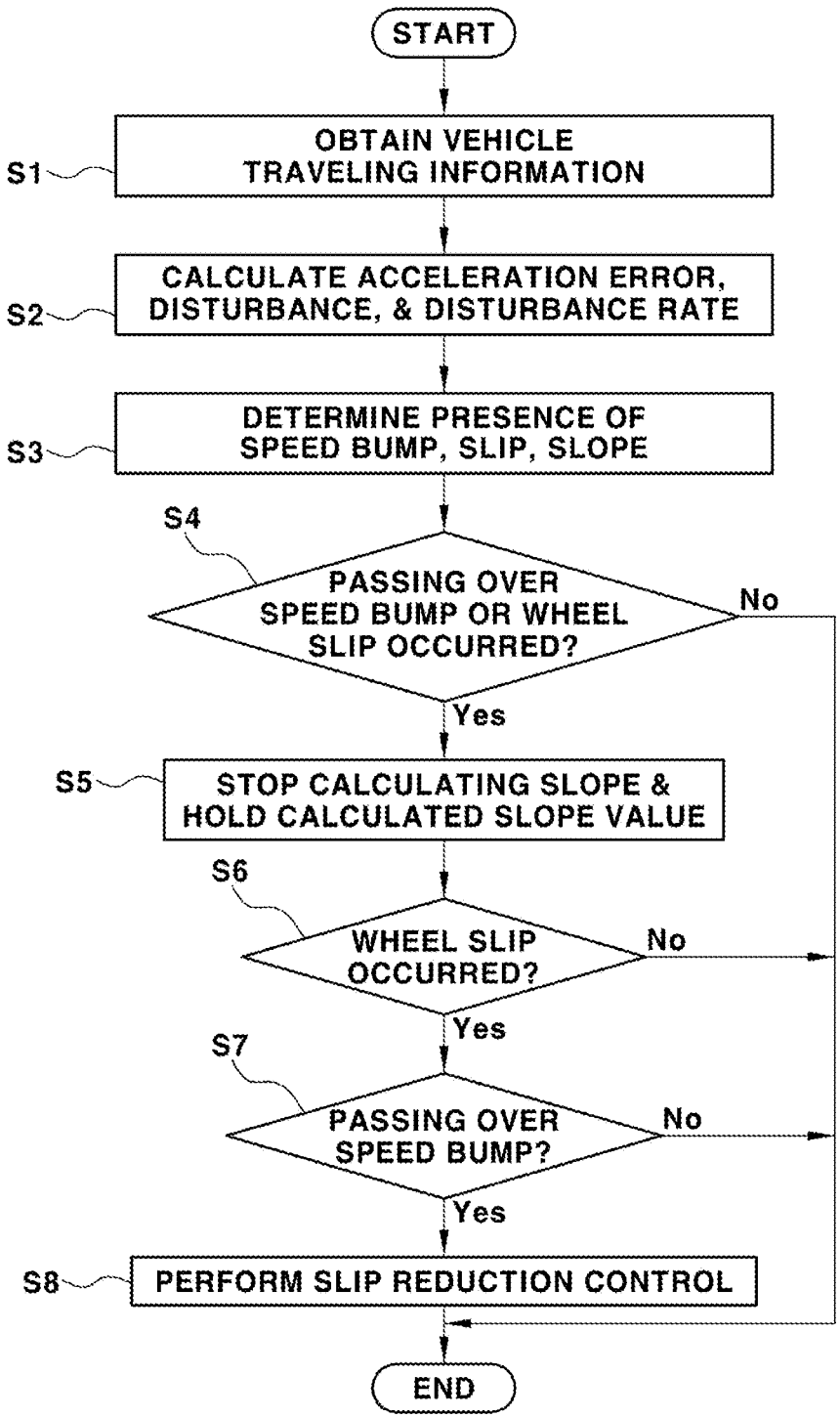
FIG. 6 is a flowchart illustrating the entire process of determining the traveling state of a vehicle and determining whether or not to enter the wheel slip reduction control according to embodiments of the present disclosure.

FIG. 6 is a flowchart illustrating the entire process of determining the traveling state of a vehicle and determining whether or not to enter the wheel slip reduction control according to embodiments of the present disclosure. Hereinafter, the entire process will be described with reference to FIG. 6.

First, in S1, the controller (i.e., the first controller) obtains real-time vehicle driving information during the traveling of a vehicle. Subsequently, in S2, the acceleration error, the acceleration disturbance, and the acceleration disturbance rate are calculated and determined in real time on the basis of the vehicle driving information as described above.

When the acceleration error, the acceleration disturbance, and the acceleration disturbance rate are determined as described above, the controller determines the traveling state of the vehicle on the basis of the real-time information in S3. When the traveling state of the vehicle is determined to be the speed bump passing or the wheel slip occurrence, the controller stops calculating a slope in accordance with the acceleration disturbance and holds a slope value calculated directly before the determination of the speed bump passing or the wheel slip occurrence as the current slope value in S4 and S5.

This is intended to exclude the influence of either a speed bump or a wheel slip, since the wheel speed information is used in the calculation of the acceleration disturbance serving as a reference for the estimation of the slope and the wheel speed is influenced by the speed bump and the wheel slip.

Afterwards, when the traveling state of the vehicle is determined to be the wheel slip occurrence instead of the speed bump passing in S6 and S7, known wheel slip reduction control operations, such as traction control (i.e., TCS control) for reducing the wheel slip, are started by the controller in S8. In contrast, when the traveling state of the vehicle is determined to be the speed bump passing without the wheel slip occurrence, the controller does not perform the wheel slip reduction control.

Since the operability may be reduced when the wheel slip reduction control is performed during the speed bump passing, it is required that the wheel slip reduction control not be performed. Thus, in the present disclosure, even in the case that the wheel slip occurrence is detected and determined, when the speed bump passing is detected and determined, the wheel slip reduction control is not performed.

In the related art, it has been difficult to separately or simultaneously determine the wheel slip and the speed bump. Thus, when the speed bump passing is detected and determined as described above, it has been impossible to prevent the entry to the wheel slip reduction control.

As described above, the method of determining the traveling state of a vehicle according to the present disclosure can accurately classify and determine the traveling states of a vehicle, such as passing over a speed bump (i.e., a height difference portion on the road surface), an occurrence of a wheel slip, and a slope (i.e., traveling on a slope), in real time.

Consequently, the reduction of the wheel slip control performance may be effectively prevented. It is also possible to reduce or prevent the problem in that the wheel slip reduction control unnecessarily malfunctions.

In particular, the speed bump passing, the wheel slip occurrence, and the slope traveling can be determined independently of each other. The speed bump passing and the wheel slip occurrence can be simultaneously determined. Consequently, in the wheel slip reduction control, malfunctions caused by a speed bump or a slope can be reliably prevented.

Since malfunctions in the wheel slip reduction control may be prevented as described above, there are advantages in that a delay at a start point of wheel slip reduction control is reduced and the wheel slip reduction control performance is improved. In addition, since waveform analysis or the like is unnecessary, a traveling state of a vehicle can be determined rapidly. For example, it is possible to perform a determination as soon as the vehicle wheels arrive at a speed bump. In addition, information regarding non-drive wheels is unnecessary.

Although the specific embodiments of the present disclosure have been described in detail hereinabove, the scope of the present disclosure is not limited to the foregoing embodiments. Those skilled in the art will could make various modifications and improvements on the basis of the principle of the present disclosure defined in the appended claims without departing from the scope of the present disclosure as defined in the appended claims.

What is claimed is:

1. A method for wheel slip reduction control of a vehicle, the method comprising:

determining, by a controller, a torque command of a drive unit to apply torque to a drive wheel in accordance with vehicle driving information collected during traveling of the vehicle;

determining, by the controller, an acceleration error in accordance with the determined torque command and information regarding a measured longitudinal acceleration of the vehicle measured by a first sensor, the acceleration error being defined by a difference between a reference longitudinal acceleration of the vehicle connected to the torque command and the measured longitudinal acceleration of the vehicle;

determining, by the controller, an acceleration disturbance rate in accordance with the determined torque command, the acceleration disturbance rate being defined by a difference between an actual rotational acceleration of the drive unit and a reference rotational acceleration of the drive unit connected to the torque command;

determining, by the controller, a current traveling state of the vehicle in accordance with the determined acceleration error and the determined acceleration disturbance rate; and performing, by the controller, a wheel slip reduction control on the basis of information on the determined current traveling state of the vehicle.

2. The method according to claim 1, wherein, in determining the acceleration error, the reference longitudinal acceleration of the vehicle is determined from wheel driving force generated by the drive wheel by the drive unit in response to the torque command, in accordance with the following equation:

wheel driving force−rolling resistance−air resistance=vehicle equivalent inertia×reference longitudinal acceleration.

3. The method according to claim 1, wherein, in determining the acceleration error, the acceleration error is estimated by a first observer configured in the controller in accordance with the torque command, the measured longitudinal acceleration of the vehicle, a measured longitudinal velocity of the vehicle measured by a second sensor, equivalent inertia of the vehicle, and a drag acceleration of the vehicle.

4. The method according to claim 3, wherein the acceleration error is determined by the first observer in accordance with the following equation:

$$\frac{d}{dt}\begin{bmatrix}\hat{v}_{x,fil}\\\hat{v}_{x,tq}\\\hat{a}_{tq}\\\hat{\gamma}_{scl}\end{bmatrix} = \begin{bmatrix}-L_{fil} & 0 & 0 & 0\\L_{p1} & -L_{p1} & 1 & \frac{T_{whl}}{I'_{nom}}\\L_{i1} & -L_{i1} & 0 & 0\\\gamma \hat{T}_{whl}L_{i1} & -\gamma \hat{T}_{whl}L_{i1} & 0 & 0\end{bmatrix}\begin{bmatrix}\hat{v}_{x,fil}\\\hat{v}_{x,tq}\\\hat{a}_{tq}\\\hat{\gamma}_{scl}\end{bmatrix} + \begin{bmatrix}L_{fil}v_{x,meas}+a_{meas}\\\frac{T_{whl}}{I'_{nom}}-a_{drag}\\0\\0\end{bmatrix},$$

where $V_{x,meas}$ is the measured longitudinal velocity of the vehicle, $a_{meas}$ is the measured longitudinal acceleration of the vehicle, $\hat{v}_{x,fil}$ is a longitudinal velocity of the vehicle filtered after being measured by the second sensor, $\hat{a}_{fil}$ is a longitudinal acceleration of the vehicle filtered after being measured by the first sensor, $L_{fil}$ is a filter gain, $T_{whl}$ is the torque command, $I'_{nom}$ is scaled equivalent inertia of the vehicle, $a_{dragg}$ is the drag acceleration of the vehicle, $L_{p1}$ is a P gain of the first observer, $L_{i1}$ is an I gain of the first observer, $\hat{\gamma}_{scl}$ is an estimated torque scaled factor, $\hat{v}_{x,tq}$ is an estimated longitudinal velocity of the vehicle, $\hat{a}_{tq}$ is an estimated longitudinal acceleration of the vehicle serving as the reference longitudinal acceleration, $\hat{a}_{tq}$ is an estimated acceleration error to be obtained, and $\gamma$ is an adaptive gain.

5. The method according to claim 1, wherein, in determining the acceleration disturbance rate, an actual rotational acceleration of the drive unit is obtained by differentiating a rotational speed of the drive unit measured by a third sensor, and the reference rotational acceleration of the drive unit is determined using the torque command as a drive unit torque in accordance with the following equation:

drive unit torque−rotational resistance torque=equivalent rotational inertia×reference drive unit rotational acceleration.

6. The method according to claim 5, wherein the drive unit comprises a motor driving the vehicle.

7. The method according to claim 1, wherein, in determining the acceleration disturbance rate, the acceleration disturbance rate is determined by the second observer configured in the controller using the measured rotational speed of the drive unit measured by a third sensor and an estimated rotational speed of the drive unit obtained by integrating the reference rotational acceleration of the drive unit determined from the torque command, in accordance with the following equation:

$$\dot{\hat{\alpha}}_{mot}=L_{i2}(\omega_{mot}-\hat{\omega}_{mot}),$$

where $\omega_{mot}$ is a measured rotational speed of the drive unit, $\hat{\omega}_{mot}$ is an estimated rotational speed of the drive unit, $L_{p2}$ is a P gain of a second observer, and $\dot{\hat{\alpha}}_{mot}$ is an acceleration disturbance rate to be obtained.

8. The method according to claim 7, wherein the reference rotational acceleration of the drive unit is determined using the torque command as a drive unit torque in accordance with the following equation:

drive unit torque−rotational resistance torque=equivalent rotational inertia×reference rotational acceleration of the drive unit.

9. The method according to claim 1, wherein, in determining the acceleration disturbance rate, the acceleration disturbance rate is determined by a second observer configured in the controller in accordance with a measured rotational speed of the drive unit measured by a third sensor and the torque command.

10. The method according to claim 9, wherein the acceleration disturbance rate is determined by the second observer in accordance with the following equations:

$$\dot{\hat{\omega}}_{mot}=\frac{1}{r_g}T_{whl}+L_{p2}(\omega_{mot}-\hat{\omega}_{mot})+\hat{\alpha}_{mot},$$

and $$\dot{\hat{\alpha}}_{mot}=L_{i2}(\omega_{mot}-\hat{\omega}_{mot}),$$

where $\omega_{mot}$ is a measured rotational speed of the drive unit, $\hat{\omega}_{mot}$ is an estimated rotational speed of the drive unit, $\dot{\hat{\alpha}}_{mot}$ is an acceleration disturbance rate to be obtained, $L_{p2}$ is a P gain of the second observer, $L_{i2}$ is an I gain of the second observer, $r_g$ is an effective gear ratio from the drive unit to the drive wheel, and $T_{whl}$ is the torque command.

11. The method according to claim 1, wherein the drive unit comprises a motor driving the vehicle.

12. The method according to claim 1, wherein, in determining the current traveling state of the vehicle,
the current traveling state comprises passing over a height difference portion of a road and a wheel slip occurrence, and
the current traveling state is determined by at least one of the passing over the height difference portion of the road or the wheel slip occurrence.

13. The method according to claim 12, wherein the height difference portion of the road comprises one of a speed bump, a raised portion, a pothole, and a recess having a concaved shape present in the road that a tire of the vehicle touches.

14. The method according to claim 12, further comprising calculating, by the controller, an acceleration disturbance by integrating the determined acceleration disturbance rate,
wherein, when the current traveling state of the vehicle is determined to be neither the passing over the height difference portion of the road nor the wheel slip occurrence, the controller converts the size of the calculated acceleration disturbance into a road slope value using a set equation, and
when the current traveling state of the vehicle is determined to be at least one of the passing over the height difference portion of the road or the wheel slip occurrence, the controller stops calculating the road slope value and holds a road slope value calculated directly before.

15. The method according to claim 12, wherein the controller divides the passing over the height difference portion of the road and the wheel slip occurrence from each other, the controller is configured such that,
when the current traveling state of the vehicle is determined to be the passing over the height difference portion of the road but not the wheel slip occurrence, the controller does not perform wheel slip reduction control, and
when the current traveling state of the vehicle is determined to be the wheel slip occurrence but not the passing over the height difference portion of the road, the controller performs the wheel slip reduction control.

16. The method according to claim 12, wherein the controller determines an upper threshold value and a lower threshold value variable in real time according to the acceleration disturbance rate, using the determined acceleration disturbance rate, and
when the determined acceleration error is a value out of a range between the determined upper threshold value and the determined lower threshold value, the controller determines the current traveling state of the vehicle to be the passing over the height difference portion of the road.

17. The method according to claim 16, wherein the controller determines the upper threshold value and the lower threshold value by obtaining an envelope value of an envelope function or a peak value of a peak-peak detection function, with the determined acceleration disturbance rate being an input.

18. The method according to claim 12, further comprising calculating, by the controller, an acceleration disturbance in real time by integrating the determined acceleration disturbance rate,
wherein the controller determines an upper threshold value and a lower threshold value variable in real time using the determined acceleration disturbance rate and the determined acceleration disturbance, and
when the determined acceleration error is a value out of a range between the upper threshold value and the lower threshold value, the controller determines the current traveling state of the vehicle to be the passing over the height difference portion of the road.

19. The method according to claim 18, wherein the controller determines the upper threshold value and the lower threshold value by obtaining an envelope value of an envelope function or a peak value of a peak-peak detection function, with a value obtained by applying predetermined weights to the determined acceleration disturbance rate and the determined acceleration disturbance, respectively, and summing the weighted acceleration disturbance rate and the weighted acceleration disturbance being an input.

20. The method according to claim 12, wherein, when the determined acceleration disturbance rate exceeds a set threshold value for determining the wheel slip occurrence, the controller determines the current traveling state of the vehicle to be the wheel slip occurrence.

* * * * *